Madison B. Camp. Cotton Planter and Cultivator.
No. 122,515.
Patented Jan. 9, 1872.
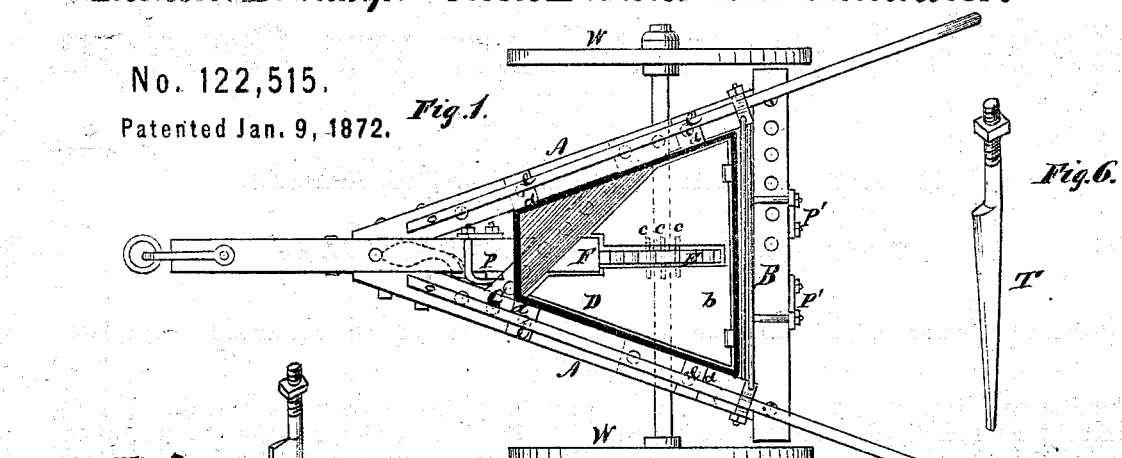
Fig. 1.
Fig. 6.
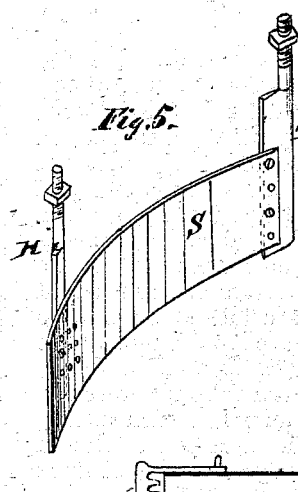
Fig. 5.
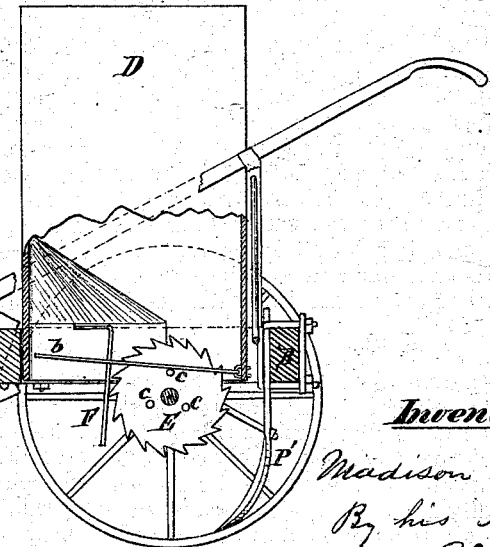
Fig. 2.
Fig. 3.
Witnesses.
Gilbert B. Fowler
J. F. Olmsted
Inventor:
Madison B. Camp
By his Attorney
W. T. Purris
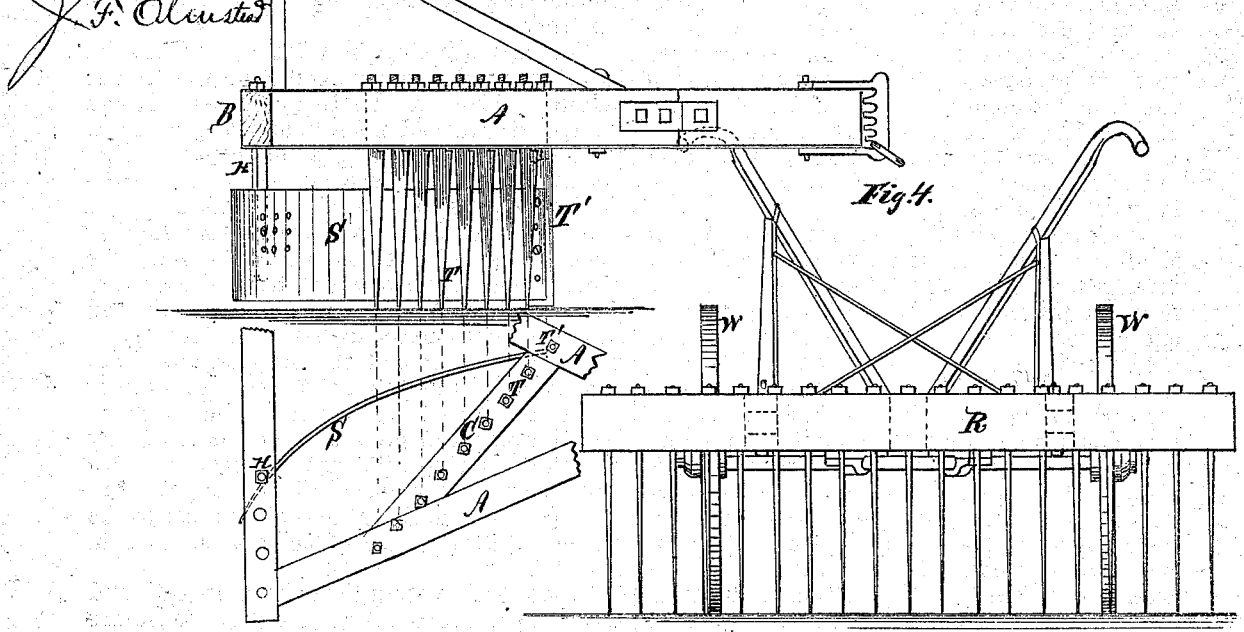
Fig. 4.
AM. PHOTO-LITHOGRAPHIC CO. N.Y. (OSBORNE'S PROCESS.)

UNITED STATES PATENT OFFICE.

MADISON B. CAMP, OF RILEY CENTRE, KANSAS.

IMPROVEMENT IN COTTON-CULTIVATORS.

Specification forming part of Letters Patent No. 122,515, dated January 9, 1872; antedated January 8, 1872.

*To all whom it may concern:*

Be it known that I, MADISON B. CAMP, formerly of Ladiga, Calhoun county, Alabama, now of Riley Centre, Kansas, have invented a new and Improved Cotton-Cultivator, which is fully described and set forth in the following specification and the accompanying drawing, in the different figures of which like letters indicate like parts, and in which—

Figure 1 is a top view. Fig. 2 is a side elevation. Fig. 3 is a side view, showing the teeth arranged angularly, with the scraper attached and a detail top view of the same. Fig. 4 is a back view, showing a cultivator-rake attached. Fig. 5 is a detached view of the scraper. Fig. 6 is a view of one of the cultivator-teeth.

Nature.

My invention relates to a convertible cotton-planter and cultivator; and consists, first, of the construction and arrangement of the parts, by which the planter is readily convertible into a cultivator by providing the frames and a diagonally-arranged middle beam with suitable holes for receiving cultivator or harrow teeth, which are constructed with screws and nuts for attaching and detaching them. Second, of a curved scraper, in combination with the planter-frames and angularly-arranged teeth for preparing the ground by the side of the drills for cross cultivation. Third, of the combination of the planter-frames and wheels with a cross cultivator-rake to be used after but in conjunction with the scraper and angularly-arranged teeth.

A A are the sides, and B the back end of the frame, and C is a middle beam, diagonally arranged, as shown in Figs. 1 and 3. D is a feed-box provided with a hinged bottom, $b$, cut out to fit over the feed-wheel so as to allow it to extend up into the feed-box, which is attached to the frames by straps $d\ d$ and screw-bolts $e\ e$, as seen in Figs. 1 and 2. E is the feed-wheel made with teeth, and is provided with three small bolts, $c\ c\ c$, arranged equidistant from the axle, which, in revolving, strike against the bottom $b$ for shaking down the seed to the feed-wheel. (See Fig. 2.) F is a spring-plate arranged in the feed-box to extend down through the bottom in front of the wheel and bearing against the points of the teeth for regulating the feed. (See Fig. 2.) P is a front plow attached by an ordinary bolt-clamp, for opening the furrow for the seed; and P' P' are two back plows, attached by clamps, for covering the seed. T represents the cultivator-teeth, made with screws and nuts for readily attaching and detaching them. S is a steel scraper made about five inches wide, one-eighth of an inch thick, and in the curve of a circle whose circumference is about thirty-six inches, and is attached by bolts to a tooth, T', having a sharp front edge, and to the supporting standard H, as seen in Fig. 5. R represents the cultivator-rake for cross-cultivation, and is about forty-five inches long, and provided with about nineteen teeth and with mortises for attaching it to the back ends of the sides A A in the place of beam B, as seen in Fig. 4. The planter may be readily converted into a cultivator by removing the feed-box D and wheels W and inserting the teeth J in the holes in frames A, provided for that purpose. When the cotton begins to come up this cultivator is run over the drills, cutting and raking off the crust, removing the small weeds and grass, and pulverizing the ground so that the growth of the cotton may be unobstructed.

For cultivating by the sides of the drills the cultivator-teeth are changed from the frames A and inserted in the diagonal beam C, and scraper S attached behind, as seen in Fig. 3. And when the cotton is about one inch high the cultivator, being arranged as above described, is run by the side of the drill, the front tooth T' having a sharp edge running as closely as possible to the cotton, and all the teeth extending about one inch into the ground, pulverize it, and remove the stones, clods, and other trash from the drill to the middle between the rows; and the scraper following, lightly upon the ground, protects the young plants and brushes away the remaining rubbish, leaving the ground clean and level by the sides of the drills preparatory for cross-cultivation, which is accomplished by the cultivator-rake R attached to the back end of the frames A in the place of beam B, as seen in Fig. 4.

In cross-cultivating the cultivator-teeth and the scraper are removed and the wheels are attached toward the forward end of the frames A, and the rake teeth are dropped into the ground about one inch deep several inches from the drill, and run lightly through the drill and are lifted over the rubbish in the middle. The rake-teeth cut up small portions of the cotton, thus properly thinning it, and cut apart the remaining plants, and cut up and cover up the small grass and weeds, leaving the cotton in good condition for thrifty growth. This cross-cultivation is performed always after the ground by the sides of the drills has been prepared as described.

This planter and cultivator may be used for planting and cultivating not only cotton but also sugar-cane and other products; and by the processes described the cultivation may be performed by horse-power entirely until the plants are four or five inches high, thus saving a very large portion of the hand work. The cultivator-rake may be used also in cultivating drilled wheat by arranging the teeth so that they will run between the drills.

*Claims.*

What I claim and desire to secure by Letters Patent, is—

1. The frames A B C, as constructed, all being provided with holes for teeth T, and the back end of beams A A being made with tenons for attaching and detaching beam B or rake R, and beam C being arranged diagonally, substantially in the manner and for the purposes described.

2. The curved scraper S, provided with tooth T' and standard H, in combination with the frames A B C, substantially as described.

In attestation of the foregoing specification and claims of my improved cotton-planter and cultivator, I hereunto subscribe my name this 14th day of March, 1871.

MADISON B. CAMP.

Witnesses:
R. B. SPILMAN,
H. G. BARNER. (43)